United States Patent [19]

Prochnow

[11] Patent Number: 5,089,277
[45] Date of Patent: Feb. 18, 1992

[54] FISH BAIT AND METHOD OF MAKING SAME

[75] Inventor: John A. Prochnow, Spirit Lake, Iowa

[73] Assignee: Berkley, Inc., Spirit Lake, Iowa

[21] Appl. No.: 614,999

[22] Filed: Nov. 16, 1990

Related U.S. Application Data

[63] Continuation of Ser. No. 358,067, May 26, 1989, abandoned.

[51] Int. Cl.$^5$ .............................................. A01K 85/00
[52] U.S. Cl. ........................................ 426/1; 426/573; 426/805
[58] Field of Search ............................ 426/1, 573, 805

[56] References Cited

U.S. PATENT DOCUMENTS

| | | | |
|---|---|---|---|
| 2,874,048 | 2/1959 | Walldov . | |
| 2,979,778 | 4/1961 | FitzSimons . | |
| 3,410,689 | 11/1968 | Nathan . | |
| 3,875,302 | 4/1975 | Inoue | 426/1 |
| 3,876,803 | 4/1975 | Stephan et al. | 426/1 |
| 4,245,420 | 1/1981 | Carr | 43/42.06 |
| 4,463,018 | 7/1984 | Carr | 426/1 |
| 4,576,821 | 3/1986 | Smith et al. | 426/1 |
| 4,764,383 | 8/1988 | Brown et al. | 426/1 |
| 4,826,691 | 5/1989 | Prochnow | 426/1 |

FOREIGN PATENT DOCUMENTS

| | | | |
|---|---|---|---|
| 137748 | 4/1985 | European Pat. Off. | 426/1 |
| 53-54593 | 5/1978 | Japan | 426/1 |
| 53-143595 | 12/1978 | Japan | 426/1 |
| 59-98637A2 | 6/1984 | Japan . | |
| 60-94047 | 5/1985 | Japan . | |
| 61-260841A2 | 4/1986 | Japan . | |
| 61-162141A2 | 8/1986 | Japan . | |
| 61-199747 | 9/1986 | Japan | 426/1 |
| 61-242548 | 10/1986 | Japan | 426/1 |

OTHER PUBLICATIONS

Anon, The Dow Chemical Company, Methocel Product Information Form No. 192-902-1082, pp. 1 and 2.
The Behavior of Teleost Fishes, Ed. Tony J. Pitcher, The Johns Hopkins Univ. Press, 1986, pp. 152-176.
Chemical Abstracts 102 (15): 129168q.
Chemical Abstracts 104 (25): 222210y.

*Primary Examiner*—Donald E. Czaja
*Assistant Examiner*—Evan Federman
*Attorney, Agent, or Firm*—Faegre & Benson

[57] ABSTRACT

A bait or lure for fish and method of making same. The bait is comprised of a water soluble moldable body having a controlled rate of dispersion in water and a dough or putty-like consistency capable of being formed about a hook. The body is comprised of a cellulose ether and a polyalkylene glycol, such as polyethylene glycol, blended with water in a sufficient amount to form a moldable body of dough-like consistency with a slimy life-like feel when wet.

18 Claims, No Drawings

FISH BAIT AND METHOD OF MAKING SAME

This application is a continuation of application Ser. No. 07/358,067, filed May 26, 1989, now abandoned.

BACKGROUND OF THE INVENTION

1. Field of the Invention

This invention relates to a bait or lure for fish and the method of making same. In particular there is provided a bait or lure comprised of a water soluble moldable body having a controlled rate of dispersion in water and a dough or putty-like consistency capable of being formed about a hook in differing shapes or forms. The body, which may also contain, natural and artificial fish attractants, and the usual preservative, dyes or pigments, and other agents is comprised of a cellulose ether and a polyalkylene glycol blended with water in an amount sufficient to form a moldable body of dough-like consistency.

2. Description of Related Art

Various artificial baits have been proposed in the past, containing fish attractants either natural or artificial. Many of them have been rigid plastics or porous sponge like bodies. U.S. Pat. No. 4,245,420 to William E. S. Carr describes an artificial bait comprising a semi-rigid, flexible, water insoluble, hydrophilic matrix, permeable by diffusion to passage of an attractant incorporated therein. The matrix is a gel-like solid phase of a variety of materials, of which gelatin is preferred. The gels may be modified with gel-like thickening materials such as acacia, agar, agarose, carrageenan, guar gum, pectin, starch, protein, collagen and synthetic polymers, such as polyvinylpyrrolidone.

Another patent to Carr, U.S. Pat. No. 4,463,018, also utilizes a substantially water insoluble matrix of gelatin, agar, locust bean gum, Celufil (a partially hydrolyzed cellulose) formed with water and glycerol at elevated temperature not exceeding 100° C.

An abstract of a Japanese Application No. 84/198,765, 25 September 1984, (published Japan Kohai Tokyo Koho, JP 60/94047 A2, 85/94047, 27 May 1985), apparently corresponding to U.S. application Ser. No. 535,491 filed September 1983, describes a fish bait, prepared by combining polymers such as soluble cellulose esters or polyvinyl alcohols, plasticizer and fish attractants. Thus propylene glycol and hydropropyl methyl cellulose were mixed with fish attractants, such as amino acid mixtures with ascorbic acid as a stabilizer, and made into lures.

In my U.S. Pat. No. 4,826,691 of May 2, 1989 a powdered carrier for fish attractant is disclosed, which contains a cellulose ether which can be applied to fish lure.

Although there is evidence that feeding behavior in different species is stimulated by somewhat different chemical substances, four indicia have been identified as characteristic of all feeding stimulants. According to the THE BEHAVIOR OF IELEOST FISHES, Edited by Tony J. Pitcher, The Johns Hopkins University Press, 1986, page 167, fish feeding stimulants are: (1) low molecular weight (<1000 MW), (2) non-volatile, (3) contain nitrogen, and (4) are amphoteric. Individual compounds, such as betaine, glycine, alanine and taurine, have been identified as contributing major attractant effectiveness, but mixtures of attractants have nearly always been identified as more effective than single compounds. For example, the effect of amino acids on the behavior and visceral systems of fish has been reported in Chemical Abstracts 102 (15): 129168q. Glutamic and aspartic acids were observed to attract salmonids. Cod were attracted to dicarboxylic amino acids and certain other amino acids. A study of the attraction of coral fish to sea anemone has been presented in Chemical Abstracts 104 (25): 222210y. A combination of amines, including tryptamine and tyramine, were determined to be the attractive substances in the secretion of sea anemone.

BRIEF SUMMARY OF THE INVENTION

In its broadest aspect the invention deals with a bait comprising a water soluble, moldable body having a controlled rate of dispersion in water and a dough or putty-like consistency capable of being formed about a hook, the body comprising a water soluble cellulose ether and a polyalkylene glycol, such as polyethylene glycol, blended with an amount of water sufficient to form a moldable body of dough-like consistency. The combination of the polyalkylene glycol and cellulose ether, provides a mass sufficiently flexible to be moldable about a hook in varying shapes or forms. The mass also has a slippery or slimy feel when wetted, which may be described as a mucous membrane feel or the feeling of a live natural bait.

The bait is prepared by blending the dry, powdered cellulose ether and polyethylene glycol at room temperature. Water is then added to the blend and mixed to the desirable dough or putty-like consistency. Optional ingredients in the bait, such as natural and artificial attractants, preservatives, plasticizers anti-tack agents, chelating agents, dyes and/or pigments are added as appropriate either to the dry blend or to the water. An exothermic reaction takes place in the combination of the cellulose ether, polyalkylene glycol and propylene glycol when mixed with the water providing a slight rise in temperature above room temperature. No application of heat or elevated temperatures are required thereby avoiding decomposition or degradation of any active ingredients in the bait.

DETAILED DESCRIPTION OF THE INVENTION

As indicated in the summary, the bait is comprised of a water soluble moldable body which is provided by a mixture of a cellulose ether and a polyalkylene glycol with a sufficient amount of water to provide a dough or putty-like consistency. The body is water soluble and with the exception of a small amount of particulate material will eventually dissolve completely in water. The rate of dissolution and thereby dispersion of any attractant, therein will depend largely on the concentration and molecular weight of the cellulose ether and polyalkylene glycol employed. The higher the molecular weight the slower the rate of dispersion dissolution.

The cellulose ethers are readily available commercially and are well known. They are generally prepared from alkali cellulose reacted with etherification agents, such as alkyl halides, halocarboxylic acids, dialkyl sulfates and alkylene oxides. The cellulose ethers include methylcellulose, hydroxyethyl cellulose, hydroxypropyl cellulose, methyl hydroxypropyl cellulose, ethyl hydroxyethyl cellulose, methylhydroxybutyl cellulose, carboxymethyl cellulose, carboxymethyl methyl cellulose, hydroxyethyl hydroxypropyl methyl cellulose, methyl hydroxyethyl cellulose and the like. Of these methyl cellulose (MC), hydroxyethyl cellulose (HEC) and carboxymethyl cellulose (CMC) are preferred.

Generally the molecular weight of the cellulose ether is determined by the molecular weight of the cellulose pulp employed in its preparation. In this invention, the cellulose ethers have a molecular weight between about 100,000 to 500,000, preferably between 250,000 to 300,000.

The polyalkylene glycols employed in the invention are those in which the alkylene group contains 2 or 3 carbon atoms. The polyethylene glycols are preferred and are available commercially. The products employed herein will have a molecular weight in the range of about 10,000 to 6 million, preferably above 100,000 with the preferred being about 5 million. Based on the total bait composition, in which all optimal ingredients which may form a part of the moldable body, the composition by weight will range from about 15 to about 50% water, about 5 to about 20% cellulose ether and about 0.1 to about 5% polyethylene glycol. Based on only the three components, cellulose ether, polyethylene glycol and water, the cellulose ether will comprise about 8 to 71% by weight and the polyethylene glycol about 0.1 to 20% by weight with water being the remainder, about 37-90% by weight. The amount of water present in the total composition will depend largely on the concentration of the cellulose ether and polyethylene glycol and the molecular weights thereof and any liquid optional ingredient in the formulation, and will be adjusted to provide the desired moldable, consistency and feel properties of the bait.

In some cases the moldable body may be somewhat tacky, requiring the addition of an anti-tack or anti-tacking agent. While a wide variety of agents are available for such purpose the preferred reagents are the alkylene glycols such as ethylene glycol or propylene glycol. Propylene glycol is the preferred agent and is compatible with the composition and retains the appropriate feel of the moldable body. The amount employed is an amount effective to eliminate or minimize tackiness. In general, this will be an amount of from about 1 to 40% of the total composition, largely dependent on the particular cellulose ether and polyalkylene glycol employed.

A bait will generally include an attractant. The attractant to be incorporated into the present formulation may be any material or combination of materials which attract or stimulate aquatic life, such as fish and crustaceans, to feed. A wide variety of attractants, including those cited in the background prior art discussed in commonly assigned U.S. Pat. No. 4,826,691, have been found to be suitable. For example, U.S. Pat. No. 2,874,048, describes powdered bone meal, powdered food solids and powdered anise as having an attractant action on fish. U.S. Pat. No. 2,979,778 recommends rhodinyl acetate for its attractant action. In U.S. Pat. No. 3,410,689, suitable powdered materials described as attractive to fish and crustaceans are dehydrated fish meal, dried slaughterhouse waste products, powdered fish, egg, dried milk products and molasses. U.S. Pat. No. 3,875,302 describes fish powders and synthetic spices having a smell similar to that of fish meal, fish oil, stale fish or shell fish.

Very useful attractants stimulating to both fish and crustaceans are described in U.S. Pat. No. 4,245,420 and in the references cited therein.

U.S. Pat. No. 4,576,821, describes powdered fish or fish meal as an attractant for fish crustaceans. Suitable attractants for use in the present formulation are also created by using single or mixed attractant materials such as krill powder, pulverized dried sardine, spray dried inactivated and/or autolyzed yeast, powdered squid, borax, wood flour, bentonite, pulp fibers, and cellulosic materials (Japan 61/162141 A2 [86/162141], Japan 61/260841 A2 [86/260841], Japan 59/98637 A2 [84/98637], Brit. GB 1567846). Dicarboxylic amino acids and other amino acids, such as glutamic and aspartic acids, are described as species-specific fish attractants in Shparkovskii, et al., Chemical Abstracts 102(15):129168q. Individual amine compounds, such as betaine, glycine, alanine, taurine, tryptamine, and tyramine, have been identified as having an attractant effect, but mixtures are nearly always more effective than single compounds.

Academic study of fish behavior relating to chemoreception describes a wide variety of attractant materials suitable for use in the present formulation. Very useful attractant are disclosed in the following publications:

Hara, Toshiaki J., "Chemoreception," Fish Physiology, Vol. 5, 1971, pp. 79–120, Academic Press Inc.

Hara, Toshiaki J., "Olfaction in Fish," Progress in Neurobiology, Vol. 5, Part 4, 1975, pp.271–335, Pergamon Press.

Hara, Toshiaki J. (Ed.), "Chemoreception in Fishes," Developments in Aquaculture and Fisheries Science, 8, 1982, Elsevier Scientific Publishing Co.

Pitcher, Tony J. (Ed.), "The Role of Olfaction in Fish Behavior," The Behavior of Teleost Fishes, 1986, pp. 152–176, The Johns Hopkins University Press.

The percentage of attractant in the present formulation is determined primarily by the nature of the specific attractant material. Certain attractants, which have an extremely concentrated attractive effect on aquatic life, may be used in the present formulation in amounts as low as between about 0.1–10 weight percent of the total formulation. When bulky or general attractants, such as powdered fish meal, are used in the present formulation, they are generally present in an amount of at least about 5 weight percent of the total formulation. Broadly, formulation of the present invention containing amounts of attractant in the range of between about 0.1–80 weight percent of the total formulation have been found to be effective in luring aquatic life.

Mixtures of two or more artificial or synthetic attractants may be employed.

Different colored baits are desired by fishing persons and believed to also attract certain species of fish. Accordingly, colors are generally added to the bait to provide moldable baits of a variety of colors. Thus, dyes and pigments, commercially available are added in liquid or powdered form during the preparation of the bait, such as red, pink, orange or yellow dyes and titanium dioxide for white colored baits. The amount of colorant added is dependent largely on the color level desired and will generally not exceed 3 or 4% by weight of the total composition in the case of the dyes, or 15% in the case of a pigment used, such as titanium dioxide.

Preservatives are generally added to the bait formulation, particularly in view of the use of natural attractants therein and the length of storage time between manufacture and use of the bait. In general it is not necessary to exceed about 3% by weight of the bait composition to provide an effective amount of preservative. Illustrative of some of the preservaties are potassium sorbate, DMDM hydantoin, 1,3-dimethylol-5,5-dimethyl-hydantoin (available commercially from McIntyre Chemical Company), and Germall II, N-(hydroxymethyl)-N-(1,3-dihydroxy-methyl-2,5-dioxo-4-imidazolidinyl)-N-(hydroxymethyl) urea, (available commercially from Sutton Labs). The parabens also, Methyl, propyl, and the combination of (available commercially from Inolex Personal Care Products or Mallinekrodt), Butylated Hydroxyanisole, BHA; 3,5-Di tert-Butyl-4-Hydroxyanisole, and Butylated Hydroxytoluene, BHT; 2,6-Di-tert-Butyl-p-Cresol, (both available commercially from Kraft Chemical Co.), Citric Acid, Sorbic Acid, and Sodium Propionate (available from Universal Preservachem, Inc.)

Chelating agents such as EDTA; Ethylenediaminetetracetic Acid, Hamp-ene Acid and sodium salts of Hamp-ene, (available commercially from Organic Chemicals Division, W. R. Grace Co.) may also be added to the composition.

Where buoyancy is a requirement hollow glass microspheres may be added to the bait composition in an amount up to about 20% by weight of the bait composition to provide the desired degree of buoyancy.

The present invention also is directed to the method of preparation of the moldable bait. While large scale commercial production may depart therefrom, small batch preparation illustrates the method. The primary advantage of the method of the present invention lies in the fact that there is no need for elevated temperature and the preparation is carried out at ambient room temperature. The blending of the cellulose ether, polyethylene glycol and propylene glycol with water is exothermic and some heat is evolved which will slightly raise the temperature above room temperature. The temperature will not rise up to 90° F. and generally will not exceed 80° F. Such temperature will not decompose or degrade any active ingredients present such as the attractants, preservatives and other optional agents present.

In preparing the bait of the present invention the cellulose ether and the polyethylene glycol are blended along with any anti-tack agent, and optionally an attractant. In a separate vessel there is mixed with the water (deionized) the preservatives and chelating agent and colorants. The attractant such as the fishmeal, and the micropheres of glass, if employed, are then added.

EXAMPLE I

The components as given below, in the amounts by weight indicated, were mixed following the method described above.

| Component | % by weight | | | |
|---|---|---|---|---|
| | A | B | C | D |
| Water (deionized) | 41.5 | 38.6 | 36.3 | 28.3 |
| Sodium carboxymethyl cellulose-molecular weight between 250,000 to 300,000 (7M 31 - T) | 15.5 | 15.0 | 13.9 | 6.8 |
| Polyethylene Glycol (MW. 5,000,000) | .4 | .4 | .5 | .3 |
| Preservative | 1.6 | 1.6 | 1.8 | 1.9 |
| Anti-tacking agent (propylene glycol) | 26.8 | 25.3 | 24.3 | 19.7 |
| Attractant | 4.2 | 5.0 | 9.6 | 41.0 |
| Chelating Agent (EDTA) | 2.0 | 2.0 | 2.0 | 2.0 |
| Dye or Pigment | 1.0 Red | 3.6 titanium dioxide | 11.6 titanium dioxide | |
| Glass Microspheres | 7.0 | 8.5 | | |

The foregoing baits composed as shown above, were semi rigid, moldable, semi non-tacky baits. The baits could be molded about a hook in varying shapes and forms. Bait A was a red bait while bait B and C are white baits. Bait D was formulated as a natural colored bait. Similar baits are also formulated for most species of fish.

The use of deionized water is preferred in the baits as shown in the examples although it is recognized that "water" as referred to herein can be interpreted to refer to aqueous solutions of salts, starches, sugars and alcohols or the like in concentrations which would produce similar results without departing from the invention as claimed below.

What is claimed is:

1. A bait comprising a water soluble moldable body having a controlled rate of dispersion in water with the slimy feel of live bait and a reshapable or reformable consistency capable of being formed about a hook, said body comprising a water soluble cellulose either having a molecular weight between about 100,000 to 500,000 and a polyalkylene glycol in which the alkylene group contains 2 or 3 carbon atoms, said polyalkylene glycol having a molecular weight between about 10,000 to 6 million, blended with an amount of water sufficient to form a moldable body of consistency capable of being formed about a hook.

2. A method of preparing a water soluble moldable bait having a controlled rate of dispersion in water with the slimy feel of live bait and a reshapable or reformable consistency capable of being formed about a hook, said method comprising
   (a) blending a water soluble cellulose either having a molecular weight between about 100,000 to 500,000 and a polyalkylene glycol in which the alkylene group contains 2 or 3 carbon atoms, said polyalkylene glycol having a molecular weight between about 10,000 to 6 million and subsequently
   (b) mixing said blend with water in a sufficient amount to provide a moldable body of reshapable or reformable consistency capable of being formed about a hook;
in absence of application of heat such that the temperature throughout the preparing is at ambient temperature up to less than 90° F.

3. A bait as defined i claim 1 wherein based on the total weight of cellulose either, polyalkylene glycol and water, said bait is comprised of from about 8 to 71% by weight cellulose ether, from about 0.1% to 20% polyalkylene glycol and about 37-90% water.

4. A bait as defined in claim 3 wherein said polyalkylene glycol is polyethylene glycol having a molecular weight of about 100,000.

5. A bait as defined in claim 3 wherein said polyalkylene glycol is a polyethylene glycol having a molecular weight of about 6 million.

6. A bait as defined in claim 3 wherein said cellulose ether is selected from the group consisting of carboxymethyl cellulose, hydroxypropyl cellulose, methyl hydroxypropyl cellulose, ethyl hydroxyethyl cellulose, methylhydroxybutyl cellulose, carboxymethyl methyl cellulose, hydroxyethyl hydroxypropyl methyl cellulose, methyl hydroxyethyl cellulose, methyl cellulose and hydroxyethyl cellulose, and said polyalkylene glycol is polyethylene glycol.

7. A bait as defined in claim 6 wherein said cellulose ether is sodium carboxymethyl cellulose having a molecular weight between about 250,000–300,000 and said polyethylene glycol has a molecular weight of about 6 million.

8. A bait as defined in claim 6 wherein said cellulose ether is sodium carboxymethyl cellulose having a molecular weight between about 250,000–300,000 and said polyethylene glycol has a molecular weight of about 100,000.

9. A bait as defined in claim 1 and further comprising a fish attractant.

10. A bait as defined in claim 9 wherein said fish attractant is selected from the group consisting of materials which attract or stimulate feeding of aquatic life and mixtures thereof.

11. A bait as defined in claim 10 wherein based on the total composition of said bait, said bait comprises by weight about 5 to 20% cellulose ether, about 0.1 to 5% polyalkylene glycol, about 15 to 50% water and up to about 80% of a fish attractant.

12. A bait as defined in claim 11 wherein said cellulose ether is carboxymethyl cellulose, said polyalkylene glycol is polyethylene glycol having a molecular weight between about 10,000 to 6 million.

13. A bait as defined in claim 12 and further comprising an anti-tack agent in an amount effective to render the moldable body substantially non-tacky.

14. A bait as defined in claim 13 wherein said anti-tack agent comprises propylene glycol in an amount of about 1–40% of the total bait composition.

15. A method of preparing a water soluble moldable bait as defined in claim 2 wherein based on the total weight of cellulose ether, polyalkylene glycol and water, said cellulose ether is present in an amount of about 8–71%, said glycol is present in an amount of 0.1 to 20% and said water is present in an amount of 37–90%.

16. A method as defined in claim 15 wherein said cellulose ether is sodium carboxymethyl cellulose, said polyalkylene glycol is polyethylene glycol having a molecular weight between 100,000 and 6 million.

17. A method as defined in claim 16 wherein said blend of cellulose ether and glycol contains a non-tack agent.

18. A method as defined in claim 17 wherein said non-tack agent is propylene glycol in an amount up to 40% by weight of the total bait composition.

* * * * *

UNITED STATES PATENT AND TRADEMARK OFFICE
CERTIFICATE OF CORRECTION

PATENT NO. : 5,089,277
DATED : February 18, 1992
INVENTOR(S) : John A. Prochnow It is certified that error appears in the above-identified patent and that said Letters Patent is hereby corrected as shown below:

Column 6, line 20, after "cellulose" delete "either" and insert --ether-- therefor;

Column 6, line 33, after "cellulose" delete "either" and insert --ether-- therefor;

Column 6, line 46, after "defined" delete "i" and insert --in-- therefor; and

Column 6, line 47, after "cellulose" delete "either" and insert --ether, --therefor.

Signed and Sealed this

Twenty-fifth Day of May, 1993

Attest:

MICHAEL K. KIRK

Attesting Officer     Acting Commissioner of Patents and Trademarks